(12) United States Patent
Liu et al.

(10) Patent No.: US 12,067,929 B2
(45) Date of Patent: Aug. 20, 2024

(54) DISPLAY PANEL AND DISPLAY DEVICE

(71) Applicant: Yungu (Gu'an) Technology Co., Ltd., Hebei (CN)

(72) Inventors: Rusheng Liu, Langfang (CN); Hongrui Li, Langfang (CN); Rubo Xing, Langfang (CN)

(73) Assignee: Yungu (Gu'an) Technology Co., Ltd., Langfang (CN)

(*) Notice: Subject to any disclaimer, the term of this patent is extended or adjusted under 35 U.S.C. 154(b) by 52 days.

(21) Appl. No.: 17/988,050

(22) Filed: Nov. 16, 2022

(65) Prior Publication Data

US 2023/0071720 A1    Mar. 9, 2023

Related U.S. Application Data

(63) Continuation of application No. PCT/CN2021/095176, filed on May 21, 2021.

(30) Foreign Application Priority Data

Aug. 28, 2020 (CN) .......................... 202010885635.X

(51) Int. Cl.
*G09G 3/30*     (2006.01)
*H04N 23/951*   (2023.01)

(52) U.S. Cl.
CPC .............. *G09G 3/30* (2013.01); *H04N 23/951* (2023.01); *G09G 2300/0426* (2013.01); *G09G 2300/0439* (2013.01)

(58) Field of Classification Search
CPC .... H04N 23/951; H04N 23/95; H04N 23/955; H04N 23/957; H04N 23/90; G09G 3/30; G09G 2300/0426; G09G 2300/0439
See application file for complete search history.

(56) References Cited

U.S. PATENT DOCUMENTS

2019/0373229 A1*  12/2019  Zhang ................. G09G 3/3225

FOREIGN PATENT DOCUMENTS

| CN | 100557847 C  |   | 11/2009 |           |
|----|--------------|---|---------|-----------|
| CN | 208861990 U  | * | 5/2019  | H10K 59/00 |
| CN | 110189627 A  |   | 8/2019  |           |
| CN | 110767106 A  |   | 2/2020  |           |
| CN | 110767714 A  |   | 2/2020  |           |
| CN | 110783390 A  |   | 2/2020  |           |

(Continued)

OTHER PUBLICATIONS

PCT International Search Report for International Application No. PCT/CN2021/095176 dated Aug. 3, 2021.

(Continued)

*Primary Examiner* — Nelson M Rosario
*Assistant Examiner* — Scott D Au
(74) *Attorney, Agent, or Firm* — Rimon PC

(57) ABSTRACT

Disclosed are a display panel and a display device. By setting at least two image capturing regions and providing at least two image capturing components corresponding to the at least two image capturing regions respectively, the at least two image capturing components capture images through the at least two image capturing regions to obtain at least two images, and process the at least two images to eliminate a plurality of diffraction light spots, so as to obtain a final image without the diffraction light spots, thereby improving a display effect.

20 Claims, 3 Drawing Sheets

(56) References Cited

FOREIGN PATENT DOCUMENTS

| | | | | |
|---|---|---|---|---|
| CN | 110783487 | A | | 2/2020 |
| CN | 111010468 | A | | 4/2020 |
| CN | 111047967 | A | | 4/2020 |
| CN | 111129100 | A | | 5/2020 |
| CN | 111246073 | A | | 6/2020 |
| CN | 111261684 | A | * 6/2020 | ............ H04N 23/57 |
| CN | 111261684 | A | | 6/2020 |
| CN | 111405087 | A | | 7/2020 |
| CN | 111405087 | A | * 7/2020 | ............ H04N 23/80 |
| CN | 111476747 | A | | 7/2020 |
| CN | 111526278 | A | | 8/2020 |
| CN | 111968516 | A | | 11/2020 |
| CN | 112002749 | A | | 11/2020 |
| CN | 112071886 | A | | 12/2020 |
| CN | 112271263 | A | | 1/2021 |
| CN | 113079298 | A | | 7/2021 |
| IN | 112258439 | A | | 1/2021 |

OTHER PUBLICATIONS

PCT Written opinion for International Application No. PCT/CN2021/095176 dated Aug. 3, 2021.

Chinese first office action for application No. 202010885635.X dated Jul. 29, 2021.

Chinese second office action for application No. 202010885635.X dated Apr. 1, 2022.

Chinese Notification of Rejection (including English translation) corresponding to Chinese Application No. 202010885635.X, dated Jan. 9, 2023; 19 total pages.

\* cited by examiner

DISPLAY PANEL AND DISPLAY DEVICE

CROSS-REFERENCE TO RELATED APPLICATIONS

This application is a continuation of International Application No. PCT/CN2021/095176, filed on May 21, 2021, which claims priority to Chinese Patent Application No. 202010885635.X, filed on Aug. 28, 2020. The entire content of both applications is incorporated herein by reference in their entireties.

TECHNICAL FIELD

This application relates to the technical field of display screens, and in particular, to a display panel and a display device.

BACKGROUND

With the continuous development of display panel technologies, people's requirements for display panels are also getting higher and higher, especially the requirements for display effects, such as requirements for pixel density and display area are getting higher and higher. In order to increase an area of a display area, an area of a camera that is conventionally used for setting is also used for display, which may not only improve a screen proportion, but also improve an aesthetic. However, when a camera area is used for display, a plurality of pixel units need to be arranged in the camera area, and a slender gap is formed between neatly arranged pixel units, which is prone to diffraction of light, resulting in light spots when taking pictures or taking videos.

SUMMARY

In view of this, embodiments of the present application are devoted to providing a display panel and a display device, by providing at least two image capturing regions in a display area, and providing a plurality of driving circuits arranged in an array and a plurality of metal traces connecting with the plurality of driving circuits in the at least two image capturing regions, a driving light emission of a plurality of pixel units in the at least two image capturing regions is realized, thereby realizing a display function of the at least two image capturing regions. Also, by setting at least two image capturing components corresponding to the at least two image capturing regions respectively, the at least two image capturing components capture images through the at least two image capturing regions to obtain at least two images, and processing the at least two images by an algorithm to eliminate a plurality of diffraction light spots. The plurality of diffraction light spots in the at least two images are different. That is, the plurality of diffraction light spots in the at least two images captured by the at least two image capturing components through different image capturing regions are different, and an algorithm is used to process the plurality of diffraction light spots in the same position in the at least two images, so as to eliminate the plurality of diffraction light spots in the at least two images, and obtain a final image without a plurality of diffraction light spots, thereby improving a display effect.

According to an aspect of the present application, an embodiment of the present application provides a display panel, including: a display area; and at least two image capturing regions in the display area, each of at least two the image capturing regions including a plurality of driving circuits arranged in an array and a plurality of metal traces connecting with the plurality of driving circuits, the at least two image capturing regions including at least two image capturing components respectively, the at least two image capturing components capturing images through the at least two image capturing regions to obtain at least two images, and processing the at least two images by an algorithm to eliminate a plurality of diffraction light spots. The plurality of diffraction light spots are different in the at least two images.

According to another aspect of the present application, an embodiment of the present application provides a display device, including the display panel described above.

The display panel and the display device provided by the present application, by providing the at least two image capturing regions in the display area, and providing the plurality of driving circuits arranged in an array and the plurality of metal traces connecting with the plurality of driving circuits in the at least two image capturing regions, the driving light emission of a plurality of pixel units in the at least two image capturing regions is realized, thereby realizing the display function of the at least two image capturing regions. Also, by setting the at least two image capturing components corresponding to the at least two image capturing regions respectively, the at least two image capturing components capture images through the at least two image capturing regions to obtain the at least two images, and processing the at least two images by an algorithm to eliminate a plurality of diffraction light spots. The plurality of diffraction light spots in the at least two images are different. That is, the plurality of diffraction light spots in the at least two images captured by the at least two image capturing components through different image capturing regions are different, and the algorithm is used to process the plurality of diffraction light spots in the same position in the at least two images, so as to eliminate the plurality of diffraction light spots in the at least two images, and obtain the final image without a plurality of diffraction light spots, thereby improving the display effect.

DETAILED DESCRIPTION OF THE EMBODIMENTS

Figure 1:
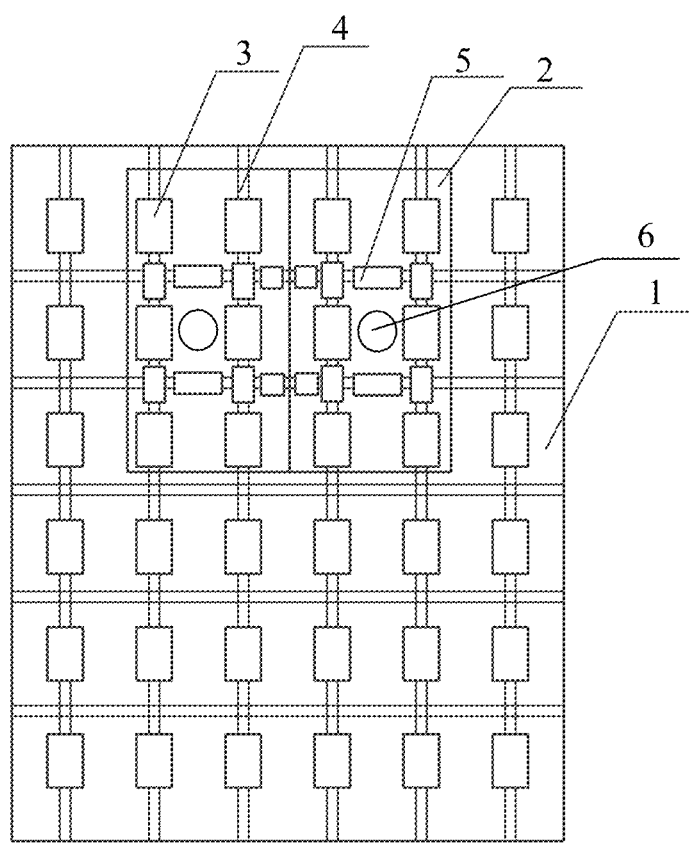
FIG. 1 is a schematic structural diagram of a display panel according to an embodiment of the present application.

The technical schemes in the embodiments of the present disclosure will be described clearly and completely below in combination with the accompanying drawings in the embodiments of the present disclosure. Obviously, the described embodiments are only a part of the embodiments of the present disclosure, not all of the embodiments. Based on the embodiments in the present disclosure, all other embodiments obtained by those skilled in the art without creative efforts shall fall within the protection scope of the present disclosure.

In order to increase a display area and a screen proportion of display panels, more and more display panels have begun to try narrow bezels or full-screen displays. However, since a display panel usually has a camera function, especially a front camera function, an image capturing component (such as a camera) is required to let external light from the display side enter the display panel. At present, it is common to set a front camera, so that the external light may be captured by the front camera, so as to realize an image capturing on the display side of the display panel. However, to realize the front camera, it is necessary to reserve a certain location area on the display panel to place the front camera. This location area may not realize display function, so that the screen proportion of the display panel may not be further improved, and a full screen may not be realized. In order to solve this problem, a camera at a bottom of the screen came into being, that is, the camera is placed at the bottom of the display screen body (a non-display side of the display panel), and a light propagation path is established between the camera and the display side of the display panel, so as to realize a front video taking or picture taking, and setting a plurality of pixel units in the camera area to realize the display function, thereby increasing the display area and screen proportion of the display panel. Although this method may realize the image capturing and displaying functions of the imaging area, due to formation of slender gaps between the plurality of pixel units, the plurality of pixel units arranged in an array and their gaps form a diffraction grating, and diffraction occurs when light from the display side of the display panel enters the diffraction grating, resulting in a plurality of diffraction light spots in a captured image. For example, when a lit street lamp is photographed at night, a bright dot will appear at a light source position of the street lamp in the image, and bright spots (possibly cross-shaped bright spots) will appear around the bright spot.

A necessary condition for the diffraction light spot is a slender slit. Therefore, some display panels reduce a pixel density of the imaging area to widen a width of the gap between a plurality of pixel units to reduce a diffraction light spot phenomenon. However, reducing the pixel density will reduce the display effect of the imaging area and make it significantly different from the display effect of other display regions, thereby reducing the display effect of the display panel and users experience effect.

In order to solve a contradiction between the diffraction light spot and the display effect, the present application provides a display panel and a display device, by setting at least two image capturing regions 2 in the display area 1 and setting driving circuits 3 arranged in an array and a plurality of metal traces 4 connecting the driving circuits in the image capturing regions 2, to realize a driving and light emitting of the plurality of pixel units in the image capturing regions, so as to realize the display function of the image capturing regions 2. Also, a plurality of diffraction light spots are eliminated by setting an image capturing component 6 in each image capturing region 2, capturing images respectively through corresponding image capturing regions 2 by at least two image capturing components 6, and performing algorithm on the at least two captured images. The plurality of diffraction light spots in the at least two images are different, that is, the plurality of diffraction light spots in the images captured through different image capturing regions 2 using at least two image capturing components 6 are different. The plurality of diffraction light spots in the same position in the at least two images are processed by an algorithm to eliminate the plurality of diffraction light spots in the images, to capture a final image without a plurality of diffraction light spots, thereby improving the display effect.

The at least two image capturing components may superimpose the plurality of diffraction light spots in the at least two images and retain only an overlapped part of the plurality of diffraction light spots. After the images are captured by the at least two image capture components respectively, the plurality of diffraction light spots in the at least two images may be superimposed by an algorithm and only the overlapped part is retained, that is, the at least two images are aligned and superimposed, so as to make center positions of the plurality of diffraction light spots at the same position in each image of the at least two images are coincident, and then bright spots at non-coincident positions are deleted or set as a background, thus realizing the elimination of the plurality of diffraction light spots. The embodiment of the present application only exemplarily provides a method for eliminating a plurality of diffraction light spots by an algorithm, and other algorithms may also be used in the present application, as long as an adopted algorithm may realize the elimination of a plurality of diffraction light spots. A specific algorithm is not limited.

As shown in FIG. 1, a display panel includes: a display area 1 and two image capturing regions 2 in the display area 1. Each image capturing region 2 includes a plurality of driving circuits 3 arranged in an array and a plurality of metal traces 4 connecting with the driving circuits 3, each image capturing region 2 includes an image capturing component 6, and the two image capturing components capture images respectively through the corresponding image capturing regions 2, and performing an algorithm on the two captured images to eliminate a plurality of diffraction light spots. A normal display function of the two image capturing regions 2 is realized by normally providing a plurality of pixel units, driving circuits for driving the plurality of pixel units to emit light, and a plurality of metal traces connecting with the driving circuits in the two image capturing regions 2 in the display area 1. A density of the plurality of pixel units disposed in the two image capturing regions 2 is consistent with other regions in the display area 1, and a density of the driving circuits disposed in the two image capturing regions 2 is consistent with other regions in the display area 1, thus ensuring display consistency of the display area 1. In this embodiment, in order to solve the diffraction light spot phenomenon in the two image capturing regions 2, an image capturing component 6 is set in each image capturing region 2, and the two image capturing components 6 respectively perform the image capturing through the corresponding image capturing regions 2, that is, optical paths of the two image capturing components to capture images are different. The plurality of diffraction light spots generated by the different optical paths are different (for example, center points of the plurality of diffraction light spots are the same, but extension directions are different, etc.), therefore the algorithm may be performed on the images captured by the two image capture components 6, so as to eliminate the plurality of diffraction light spots in the images and restore an original appearance of the images.

In this embodiment, the image capturing component may be a device that captures images such as a camera. In other embodiments, a type of the image capturing component may be selected according to requirements of an actual application scenario, as long as a selected type of the image capturing component may realize the image capturing. A specific type of the image capturing component is not limited in the present application. In this embodiment, a number of the image capturing components may be two.

Since the two image capturing components may capture two images with different diffraction light spots, that is, the two image capturing components may realize the algorithm to eliminate the plurality of diffraction light spots. Of course, other embodiments may also select the number of the image capturing components according to requirements of an actual application scenario. For example, three or more image capturing components may be selected to improve the imaging effect, as long as a selected number of the image capturing components may meet requirements of eliminating a plurality of diffraction light spots. A specific number of the image capturing components is not limited in the present application.

In this embodiment, as shown in FIG. 1, a metal layer 5 for shielding the metal traces 4 may be provided on a surface of the metal traces 4 close to the image to be captured. By providing the metal layer 5 on the metal traces 4, the metal traces 4 may be shielded by the metal layer 5, so as to avoid diffraction of light at the metal traces 4 as much as possible, thereby reducing a generation probability of diffraction light spots, that is, reducing a number of diffraction light spots. It is better for eliminating the diffraction light spots, and it may also avoid too much information in the captured image to be covered by the diffraction light spots caused by too many diffraction light spots, which also avoids image distortion after eliminating the diffraction light spots, that is, improving authenticity of the image.

In the present application, the metal layer 5 may be the metal layer M4 (that is, a metal layer where a data signal line is located) or other metal layers. The metal traces 4 may be shielded by the metal layers 5 adjacent to the metal traces 4 to avoid diffraction phenomenon. The present application may select different metal layers to shield the metal trace according to requirements of an actual application scenario, as long as a selected metal layer may shield the metal trace. A specific film layer of the metal layer is not limited in this application.

In the present application, a plurality of thicknesses, along a stacking direction of a plurality of film layers, of the plurality of metal layers 5 are different. The plurality of metal layers are configured to shield the plurality of different metal traces. By setting the plurality of thicknesses, along a stacking direction of a plurality of film layers, of the plurality of metal layers 5 shielding the metal traces 4, a light wave equation of light may be changed in terms of amplitude or phase, thereby avoiding superposition of diffracted light waves generated by the light close to each other to form a plurality of diffraction light spots, and further eliminates the plurality of diffraction light spots. In the present application, the plurality of thicknesses of the plurality of metal layers 5 may be selected according to requirements of an actual application scenario. For example, the plurality of thicknesses of the plurality of metal layers 5 gradually decrease along one direction, as long as the thickness of the selected metal layer may shield the metal trace and change the superposition of diffracted light waves. A specific thickness of the metal layer is not limited in the present application.

In the present application, a plurality of shapes of the metal traces 4 include at least one of a curve and a straight line. Since a slender slot is a necessary condition for generating a plurality of diffraction light spots, the metal traces 4 may be set as a curve, for example, a curve-function shaped line, so that a probability of generating a plurality of diffraction light spots may be reduced. In the present application, different shapes of metal traces may be selected according to requirements of an actual application scenarios, as long as the shape of the selected metal traces may realize an electrical connection of the driving circuits and reduce the probability of the generation of the plurality of diffraction light spots. A specific shape of the metal traces is not limited in the present application.

Figure 2:
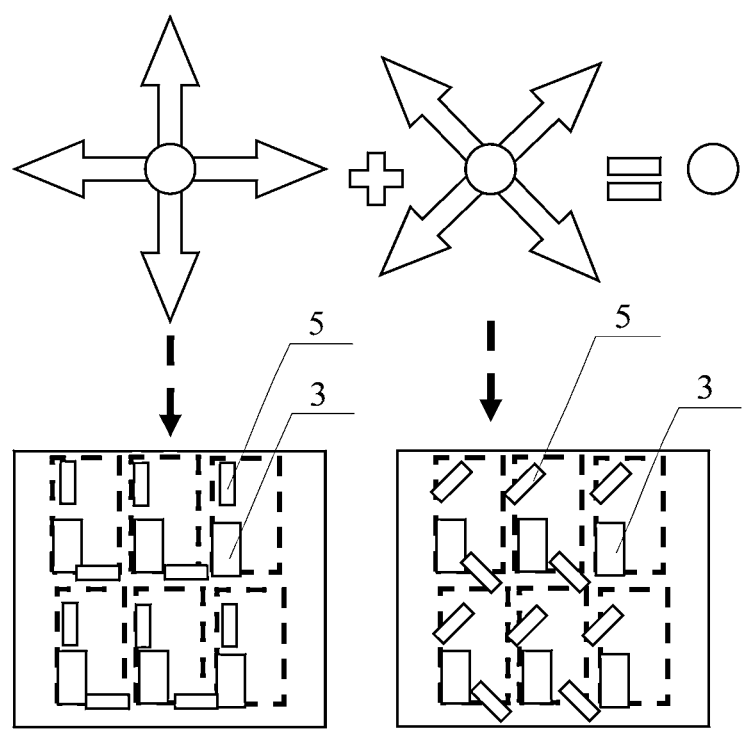
FIG. 2 is a schematic diagram for eliminating a plurality of diffraction light spots according to another embodiment of the present application, where a plurality of extending directions of a plurality of metal traces in different image capturing regions in a display panel are different.

With reference to FIG. 2, in other embodiments, a plurality of extending directions of the plurality of metal traces (not shown in FIG. 2) in different image capturing regions may be different. Taking two image capturing components and two image capturing regions as an example, the two image capturing components use the left and right image capturing regions in FIG. 2, arrangements of the driving circuits 3 in the two image capturing regions are the same, and the plurality of extending directions of the plurality of metal traces are different. Since the plurality of extending directions of the plurality of metal traces and the metal layer 5 shielding the metal traces are the same, the extension direction of the metal layer 5 in FIG. 2 represents the extension direction of the metal traces shielded by the metal layer 5. The metal layer 5 (i.e., the corresponding metal traces) in the image capturing region on the left is set horizontally and vertically, while the metal layer 5 (i.e., the corresponding metal traces) in the image capturing region on the right is set obliquely (i.e., it presents a certain oblique angle to the horizontal and vertical directions, such as 45 degrees), so that the two image capturing components may respectively capture the corresponding diffraction light spot shapes in FIG. 2, and then the two diffraction light spots are processed by the algorithm to capture an overlapped bright spot in the middle, that is, the elimination of the diffraction light spots is realized, and the image capturing effect is improved. In the present application, the extension direction of the metal traces may be selected according to requirements of an actual application scenario, as long as a selected extension direction of the metal traces may realize the electrical connection of the driving circuits and capture different shapes of diffraction light spot. A specific extension direction is not limited in the present application.

In the present application, the metal traces 4 may include transparent metal traces, and by disposing the transparent metal traces, a light transmittance of the metal traces 4 may be improved, thereby improving the effect of image capturing.

In the present application, a plurality of pixel units in the image capturing region 2 may be arranged in one direction, or may be arranged in a staggered position, which is not limited in the present application. The driving circuits 3 in the present application may be driving circuits for a traditional red, green, and blue (RGB) pixel unit, such as a Vstye-4 driving circuit, specifically, a 7T1C circuit, which is not limited in the present application.

Figure 3:
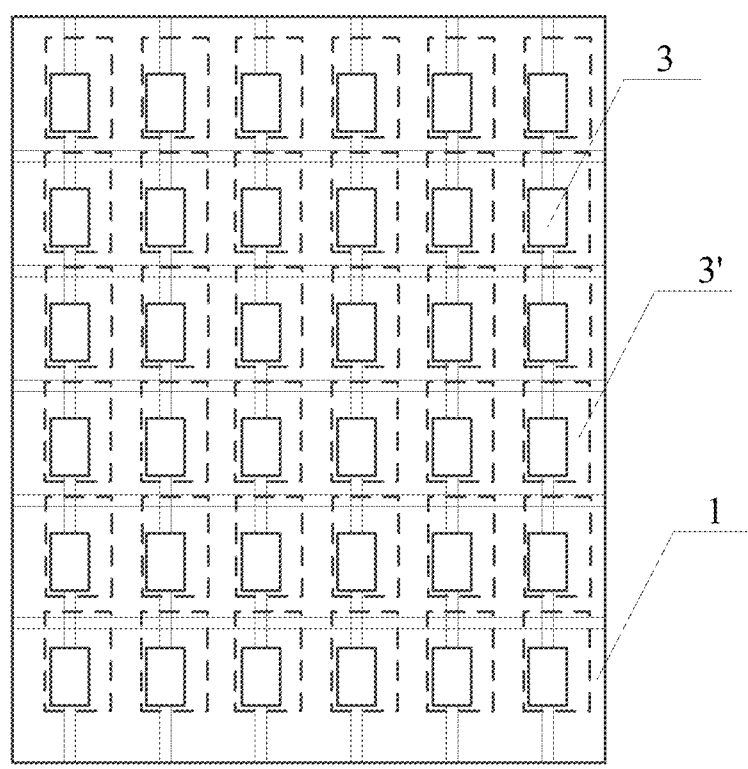
FIG. 3 is a schematic diagram showing a comparison between driving circuits of the display panel in FIG. 1 and driving circuits of a display panel of related technologies.

FIG. 3 is a schematic diagram showing a comparison between driving circuits 3 of the display panel provided by the present application and driving circuits 3' of the display panel of related technologies. As shown in FIG. 3, a line width of the driving circuit 3 may be less than or equal to 2 micrometers, and a line spacing of the driving circuit 3 may be less than or equal to 1.8 micrometers. Specifically, the driving circuits 3 may be prepared by a corresponding exposure machine, where a line width parameter of the exposure machine is less than or equal to 2 micrometers, so that the line width of the prepared driving circuits are less than or equal to 2 micrometers, and a line spacing parameter of the exposure machine is less than or equal to 1.8 micrometers, so that the line spacing of the prepared driving circuit is less than or equal to 1.8 micrometers. A size of the driving circuits 3 is reduced and placed below a corresponding anode position (a side that does not emit light), that is, the driving circuits 3 cover a side, emitting no light, of the anode of the display panel. As shown in FIG. 3, dotted lines represent the driving circuit 3' (prepared by an exposure machine with a line width parameter greater than 2 micrometers and a line spacing parameter greater than 1.8 micrometers), and solid lines represent the driving circuits 3 in the embodiment of the present application. Therefore, an opaque area is reduced, a light transmittance is guaranteed, and the effect of image capturing is improved. In the present application, a size of the driving circuits may be selected according to requirements of an actual application scenario, as long as a selected size of the driving circuits may meet the driving requirements and ensure the light transmittance. A specific size of the driving circuits is not limited in the present application.

According to another aspect of the present application, as shown in FIG. 4, the present application provides a display device including the display panel according to any one of the above embodiments. According to the display device provided by the embodiments of the present application, at least two image capturing regions are arranged in the display area, and driving circuits arranged in an array and a plurality of metal traces connecting with the driving circuits are arranged in the at least two image capturing regions, so as to realize the driving light-emitting of the plurality of pixel units in the at least two image capturing regions, thereby realizing the display function of the at least two image capturing regions. Also, by providing an image capturing component in each image capturing region, the at least two image capturing components respectively capture images through the corresponding image capturing regions, and the algorithm is performed on the at least two captured images to eliminate a plurality of diffraction light spots. That is, the plurality of diffraction light spots in the images captured through different image capturing regions using at least two image capture components are different, and an algorithm is used to process the plurality of diffraction light spots at the same position in at least two images, thereby eliminating the plurality of diffraction light spots in the images, and obtaining a final image without diffraction light spots, thereby improving the display effect.

The above embodiments are only the preferred embodiments of the present disclosure, and are not intended to limit the protection scope of the present disclosure. Any modifications, equivalent replacements, improvements, etc. made within the spirit and principles of the present disclosure should be included within the protection scope of the present disclosure.

What is claimed is:

1. A display panel, comprising:
a display area; and
at least two image capturing regions in the display area, each of the at least two image capturing regions comprising a plurality of driving circuits arranged in an array and a plurality of metal traces connecting with the plurality of driving circuits, the at least two image capturing regions comprising at least two image capturing components respectively, the at least two image capturing components capturing images through the at least two image capturing regions to obtain at least two images, and processing the at least two images by an algorithm to eliminate a plurality of diffraction light spots, wherein the plurality of diffraction light spots in the at least two images are different; and
a metal layer disposed on a surface of the metal trace close to an image to be captured, wherein the metal layer is configured to shield the metal trace.

2. The display panel according to claim 1, wherein the at least two image capturing components are configured to superimpose the plurality of diffraction light spots in the at least two images and retain only an overlapped part of the plurality of diffraction light spots.

3. The display panel according to claim 1, wherein a plurality of thicknesses, along a stacking direction of a plurality of film layers, of the plurality of metal layers are different, the plurality of metal layers are configured to shield the plurality of different metal traces.

4. The display panel according to claim 1, wherein the metal layer comprises a data signal line.

5. The display panel according to claim 1, wherein a plurality of shapes of the plurality of metal traces comprise at least one of a curve and a straight line.

6. The display panel according to claim 1, wherein a plurality of extending directions of the plurality of metal traces in different image capturing regions are different.

7. The display panel according to claim 1, wherein the plurality of driving circuits cover a side, emitting no light, of an anode of the display panel.

8. The display panel according to claim 1, wherein the plurality of metal traces comprise a transparent metal trace.

9. The display panel according to claim 1, wherein a line width of the driving circuit is less than or equal to 2 micrometers, and a line spacing of the driving circuit is less than or equal to 1.8 micrometers.

10. The display panel according to claim 1, wherein the at least two image capturing components comprise a camera.

11. The display panel according to claim 1, wherein a plurality of pixel units are arranged in the at least two image capturing regions, and a density of the plurality of pixel units in the at least two image capturing regions and a density of a plurality of pixel units disposed in a region, outside of the at least two image capturing regions, of the display area are consistent.

12. The display panel according to claim 1, wherein a density of the plurality of driving circuits in the at least two image capturing regions and a density of a plurality of driving circuits disposed in a region, outside of the at least two image capturing regions, of the display area are consistent.

13. The display panel according to claim 1, wherein a plurality of pixel units are arranged in the image capturing region, and the plurality of pixel units in the image capturing region are arranged in one direction.

14. The display panel according to claim 1, wherein a plurality of pixel units are arranged in the image capturing region, and the plurality of pixel units in the image capturing region are staggered.

15. A display panel, comprising:
a display area; and
at least two image capturing regions in the display area, each of the at least two image capturing regions comprising a plurality of driving circuits arranged in an array and a plurality of metal traces connecting with the plurality of driving circuits, the at least two image capturing regions comprising at least two image capturing components respectively, the at least two image capturing components capturing images through the at least two image capturing regions to obtain at least two images, and processing the at least two images by an algorithm to eliminate a plurality of diffraction light spots, wherein the plurality of diffraction light spots in the at least two images are different, and the plurality of driving circuits cover a side, emitting no light, of an anode of the display panel.

16. The display panel according to claim 15, wherein the at least two image capturing components are configured to superimpose the plurality of diffraction light spots in the at least two images and retain only an overlapped part of the plurality of diffraction light spots.

17. The display panel according to claim 15, wherein a plurality of shapes of the plurality of metal traces comprise at least one of a curve and a straight line.

18. A display panel, comprising:
a display area; and
at least two image capturing regions in the display area, each of the at least two image capturing regions comprising a plurality of driving circuits arranged in an array and a plurality of metal traces connecting with the plurality of driving circuits, the at least two image capturing regions comprising at least two image capturing components respectively, the at least two image capturing components capturing images through the at least two image capturing regions to obtain at least two images, and processing the at least two images by an algorithm to eliminate a plurality of diffraction light spots, wherein the plurality of diffraction light spots in the at least two images are different, and a line width of the driving circuit is less than or equal to 2 micrometers, and a line spacing of the driving circuit is less than or equal to 1.8 micrometers.

19. The display panel according to claim 18, wherein the at least two image capturing components are configured to superimpose the plurality of diffraction light spots in the at least two images and retain only an overlapped part of the plurality of diffraction light spots.

20. The display panel according to claim 18, wherein a plurality of shapes of the plurality of metal traces comprise at least one of a curve and a straight line.

\* \* \* \* \*